UNITED STATES PATENT OFFICE.

WILLIAM E. ANDREW, OF NEW YORK, N. Y.

IMPROVEMENT IN METHODS OF MAKING A SUBSTITUTE FOR BUTTER FROM THE OILS OF ANIMAL FATS.

Specification forming part of Letters Patent No. 166,955, dated August 24, 1875; application filed August 12, 1875.

*To all whom it may concern:*

Be it known that I, WILLIAM E. ANDREW, of the city, county, and State of New York, have invented a new and Improved Process of Making Butter from the Oils of Animal Fats, as is hereinafter described.

This invention consists of the following improvements in making butter from the oils of animal fat, whereby a great saving of time, labor, and expense is effected, and better results accomplished:

Take the pure refined animal oils, such as the oils obtained from beef-suet or caul-fat after they have been prepared for this purpose. I find the oil which is made by the process described in the patent of William E. Andrew, patented August 11, 1874, and numbered 153,999, preferable, as it is pure and sweet, and has no objectionable taste or odor, as is the case with kettle or water rendered oils, such as are in general use by most of the oleomargarine or artificial-butter manufacturers. This oil, as there described, is made by taking fresh animal fat, chopping or hashing it fine, placing it in bags, and subjecting it to pressure, in a suitable press, at a temperature sufficient to start the oil. The product is then allowed to cool, when it is again placed in bags, and subjected to a second pressure at a lower temperature, whereby the oil is separated from the stearine, and a desirable oil is obtained. I first take the oils after they have been carefully prepared, and add to the oils a sufficient quantity of annotto to color it to the required shade. To one hundred pounds of this oil I add one pound of Ashton salt. The oil thus prepared is then poured into a churn, and the churn set in motion, the stroke of which should be regulated or graduated to from sixty-five to seventy-five strokes per minute, and the churning continued for from twenty to thirty minutes, when the oil globules will be completely broken up, and the mass thoroughly amalgamated. I then stop the churn, and as quickly as possible pour the mass from it on or amid pulverized ice, or into very cold water, and stir it briskly until it is hard and firm. I then remove it to an inclined tray for the purpose of draining, and, when thoroughly drained, more salt may be added to flavor. The refrigerating process above described has for its object the rapid changing of the temperature of the oily mass, which, after having been churned as above described, and before it is refrigerated, becomes of a creamy consistency, and by thorough and quick refrigeration it is at once converted into a mass which has the qualities of natural butter, except the flavor. In this condition I find it very useful for culinary purposes, pastry, &c. If desirable to keep it for a length of time it should be properly worked with a sufficient quantity of salt, as may be desired.

When it is desirable to give it the flavor of natural cream-made butter I take from fifteen to twenty quarts of thick milk or cream, put it in a churn, and agitate it until the butter begins to form. I then add about one hundred pounds of the product made from the oils, and formed as before mentioned, to the cream butter already in the churn. I then agitate the mass until it becomes thoroughly homogeneous; then take the butter from the churn, place it on trays, then add salt to taste, work, and pack as practiced in ordinary butter-making; it is then ready for market.

What I claim as my invention, and desire to secure by Letters Patent, is—

1. The process of obtaining a product as a substitute for cooking-butter, consisting of churning by itself suitably-prepared oil obtained from animal fat, whereby the oil globules are broken up, and afterward subjecting it to a low temperature, as described.

2. The process of manufacturing artificial butter by churning by itself suitably-prepared animal oil, as described, and then combining the product thus obtained with butter already formed upon cream, the oil product being placed in the churn and churned until a thorough amalgamation is effected, when the mass will partake of the flavor of natural cream butter, as described.

3. The product herein described, consisting of animal oil alone, and of the character described, having the globules broken up, and having the appearance and consistency of butter, as shown and specified.

In testimony whereof I have signed my name to this specification in the presence of two subscribing witnesses.

WILLIAM E. ANDREW.

Witnesses:
WILLIAM SPARKS,
A. F. MILLER.